F. B. COOK.
NUTCRACKER.
APPLICATION FILED APR. 6, 1914. RENEWED JUNE 6, 1918.
1,274,856.
Patented Aug. 6, 1918.
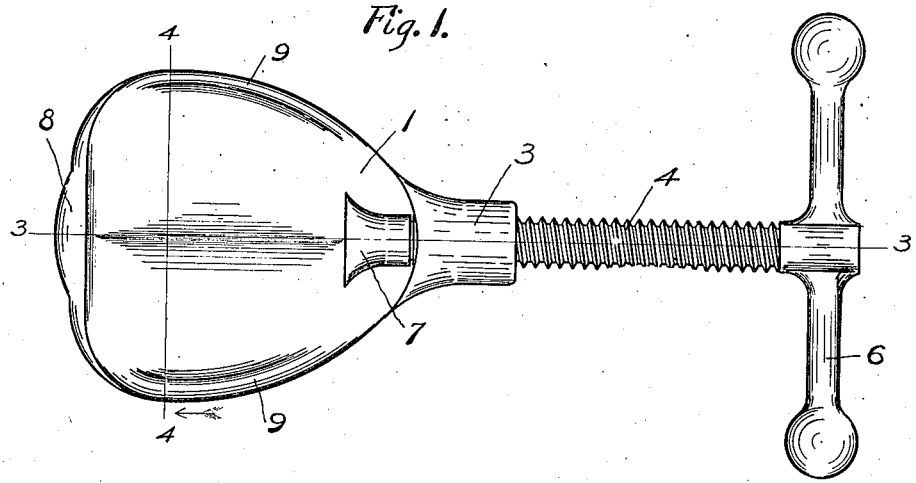
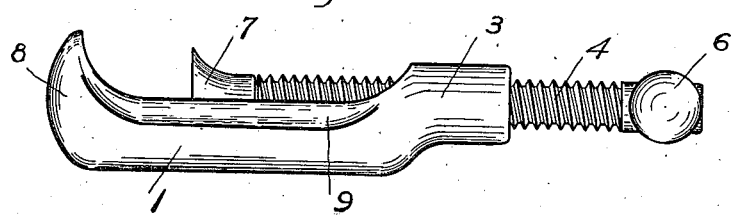
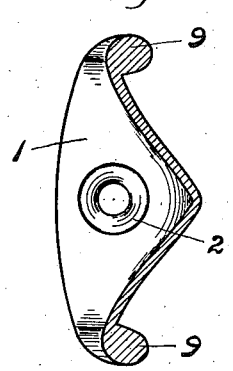
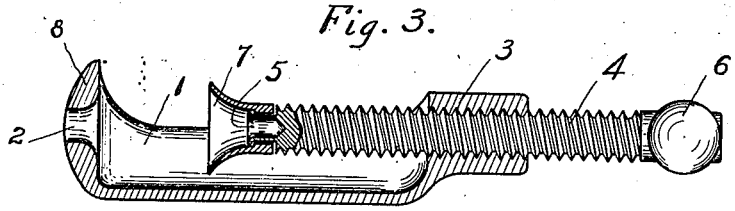
Witnesses
Inventor
Frank B. Cook

UNITED STATES PATENT OFFICE.

FRANK B. COOK, OF CHICAGO, ILLINOIS, ASSIGNOR, BY MESNE ASSIGNMENTS, TO FRANK B. COOK COMPANY, OF CHICAGO, ILLINOIS, A CORPORATION OF ILLINOIS.

NUTCRACKER.

1,274,856. Specification of Letters Patent. Patented Aug. 6, 1918.

Application filed April 6, 1914, Serial No. 829,830. Renewed June 6, 1918. Serial No. 238,607.

*To all whom it may concern:*

Be it known that I, FRANK B. COOK, a citizen of the United States, residing at Chicago, in the county of Cook and State of Illinois, have invented certain new and useful Improvements in Nutcrackers, of which the following is a specification.

This invention relates to nut crackers, the object of the invention being to provide an effective article of this character which consists of few parts and which can be inexpensively manufactured.

The device is adapted for cracking all kinds of nuts, but more especially those that are round or oblong, and acts in a manner so that the nuts are broken or forced to bulge out, so that the meats or kernels thereof may be removed in an unbroken or whole condition.

In the drawings accompanying and forming a part of this specification, I show in detail the preferred form of embodiment of the invention, which, to enable others skilled in the art to practise the same, will be set forth in detail in the following description, while the novelty of the invention will be included in the claims succeeding said description.

The nut cracker herein described consists of a spoon shaped body having a fixed or stationary jaw, and a movable jaw, the latter being preferably operated by a screw so that the amount of movement of the movable jaw necessary to break the nut can be exactly effected, which fineness of operation cannot ordinarily be performed in nut crackers wherein one or the other of the members therein are directly operated by other means, as in such other action there is lack of control, and the invariable excess movement of a movable jaw causes breaking of the kernel or meat of the nut.

Referring to the drawings: Figure 1 is a plan view of the nut cracker, Fig. 2 is a side elevation of the nut cracker, Fig. 3 is a cross section of the nut cracker on line 3—3 in Fig. 1, Fig. 4 is a cross section of the nut cracker on line 4—4 in Fig. 1. Like characters refer to like parts throughout these several figures.

The nut cracker represented in the drawings is composed of a spoon shaped body 1 forming a receptacle having a bottom of V shaped cross section, having at one extremity a fixed jaw 2, and at its other extremity a threaded boss 3; a feed screw 4 having at one extremity a reduced circular portion 5, said reduced circular portion being of hollow formation throughout its entire length; cross bars 6 at its opposite end, and a bell shaped jaw 7 provided with a cylindrical opening loosely receiving the reduced end portion 5 of said feed screw 4; the fixed jaw 2 and the movable jaw 7 being alined on the central longitudinal axis of the nut cracker. The end portion 5 is in the form of a hollow stud, upon which jaw 7 is free to rotate, said jaw being retained in position by upsetting the end of the portion 5 to form a retaining flange to engage a complemental shoulder of said jaw.

The spoon shaped body 1 has a V shaped cross section to provide a means for automatically locating the nut in proper position for cracking, regardless of the manner in which the nut may be dropped or laid in this body portion, thus doing away with the necessity for manually holding the nut in a proper position between the two jaws to insure the nut being properly cracked.

This body portion 1 has an additional advantage in that the ordinary method of using the nut cracker would be to place the hand, palm down, (after the nut has been inserted) over the top of said body portion, gripping the body portion in a natural manner to allow the application of necessary pressure to the feed screw 4 by the other hand, and the act of holding said body portion 1 in the hand, with the palm of the hand covering the V shaped opening therein, effectively prevents the flying of the broken nut shells, and after the nut has been broken, by turning the hand containing the nut cracker palm upward and removing the pressure on the feed screw, the fractured nut and broken shells will all remain in the palm of the hand, thus avoiding the unpleasant condition of flying shell parts heretofore experienced. This also provides a most convenient means of removing the nut and shells from the cracker.

The end portion 8 of the body portion 1 is of increased cross section to provide substantial means for producing the fixed jaw 2, and the two sides 9 of the body portion 1 are of rounded formation to provide a convenient and comfortable means of gripping the nut cracker during its operation.

I do not wish to limit this invention to the exact details of construction as herein shown, as many slight modifications may be made therein without departing from the scope of the invention.

What I claim is:—

1. An improved nut cracker comprising a receptacle having a bottom V-shape in cross-section, and provided at one end with a fixed jaw having an aperture therein, and at the other end with a threaded boss, a feed screw working in said boss, and a bell shaped jaw rotatably supported by said screw opposite said aperture, said bell shaped jaw being positioned over the apex of said bottom and movable in a line parallel therewith.

2. An improved nut cracker comprising a receptacle provided at one end with a fixed jaw, and at the other end with a threaded boss, a feed screw working in said boss and provided with a hollow end portion, and a movable jaw rotatably mounted on said hollow end, the latter being provided with an annular retaining flange to prevent displacement of said movable jaw.

In witness whereof, I have hereunto signed my name this third day of April, 1914, in the presence of two subscribing witnesses.

FRANK B. COOK.

Witnesses:
HARRY B. DAVIS,
C. C. NEWBURN.